United States Patent [19]
Robinson

[11] Patent Number: 5,275,203
[45] Date of Patent: Jan. 4, 1994

[54] PRESSURE REGULATOR WITH PLASTIC VACUUM FITTING

[75] Inventor: Barry S. Robinson, Newport News, Va.

[73] Assignee: Siemens Automotive L.P., Auburn Hills, Mich.

[21] Appl. No.: 37,815

[22] Filed: Mar. 26, 1993

[51] Int. Cl.⁵ .......................................... F16K 17/06
[52] U.S. Cl. ................................. 137/510; 123/463; 251/151
[58] Field of Search ............... 137/509, 510; 123/463, 123/497, 456; 251/148, 151

[56] References Cited

U.S. PATENT DOCUMENTS

| | | | |
|---|---|---|---|
| 3,568,977 | 3/1971 | Nelson | 251/148 |
| 4,284,039 | 8/1981 | Bellicardi et al. | 123/463 |
| 4,903,667 | 2/1990 | Sonnenmoser et al. | 123/463 |
| 5,065,725 | 11/1991 | Spoetter | 123/463 |
| 5,076,320 | 12/1991 | Robinson | 137/510 |
| 5,163,468 | 11/1992 | Robinson et al. | 137/510 |

*Primary Examiner*—Stephen M. Hepperle
*Attorney, Agent, or Firm*—George L. Boller; Russel C. Wells

[57] ABSTRACT

The vacuum control port at the control chamber of a fuel pressure regulator is an injection molded plastic member that can be formed with an angle. A flange is provided as a seating surface for an annular seal ring. The member extends into a tube formed in the regulator control chamber and is secured thereto.

9 Claims, 1 Drawing Sheet

PRESSURE REGULATOR WITH PLASTIC VACUUM FITTING

FIELD OF THE INVENTION

This invention relates to a fuel pressure regulator of the type used for regulating the pressure of liquid fuel in the fuel rail of an internal combustion engine fuel injection system.

BACKGROUND AND SUMMARY OF THE INVENTION

Fuel pressure regulators of the type to which the invention relates comprise a control chamber to which intake manifold vacuum is communicated. A vacuum port is provided on the fuel pressure regulator housing for the control chamber so that a conduit through which the vacuum is conveyed can be connected to the fuel pressure regulator. Various embodiments of fuel pressure regulators typically include one of the following three constructions for the vacuum port.

In a first construction, the vacuum port is formed integrally with a metal housing cover by a deep drawing process. This approach is reliable and cost-efficient, but can be used only when the vacuum port is a straight tube that is parallel to the main axis of the regulator. Commonly assigned U.S. Pat. Nos. 5,076,320 and 5,163,468 disclose fuel pressure regulators embodying this construction. Unfortunately, it is not possible to use this approach when the vacuum port must be non-parallel to the regulator main axis, such as when the vacuum port is in a radially facing portion of the cover like the cover's sidewall, or else when it contains a bend.

In a second construction, the vacuum port is a separate metal fitting that is assembled to a metal housing cover by a procedure such as brazing. This construction is more costly than the first due to the fact that there are two separate parts (the cover and the fitting) that must be processed and the fact that a brazing operation must be conducted. When the fitting must be located in the cover sidewall, the process of joining the cover to the base of the housing is made more complicated since the fitting must be brazed to the cover before the cover is joined to the base, and the presence of the fitting on the cover can be accommodated only by using more complicated tools to join the cover and base.

A third construction is like the second except that a metal spin welding process, rather than brazing, is used.

The present invention relates to a new and unique pressure regulator of the aforementioned type which allows the vacuum port to be an injection-molded part made of suitable plastic and readily mounted on a housing cover by means of relatively inexpensive equipment. The parts, equipment, and the process are cost-efficient. Principles of the invention enable a variety of different port configurations to be realized, and often to be used with a common housing cover. The various features, advantages, and benefits of the invention will appear in the ensuing detailed description of a presently preferred embodiment, which concludes with a number of claims defining the inventive principles. The description is accompanied by a drawing which discloses the best mode contemplated at this time for carrying out the invention.

DESCRIPTION OF THE PREFERRED EMBODIMENT

Figure 1:
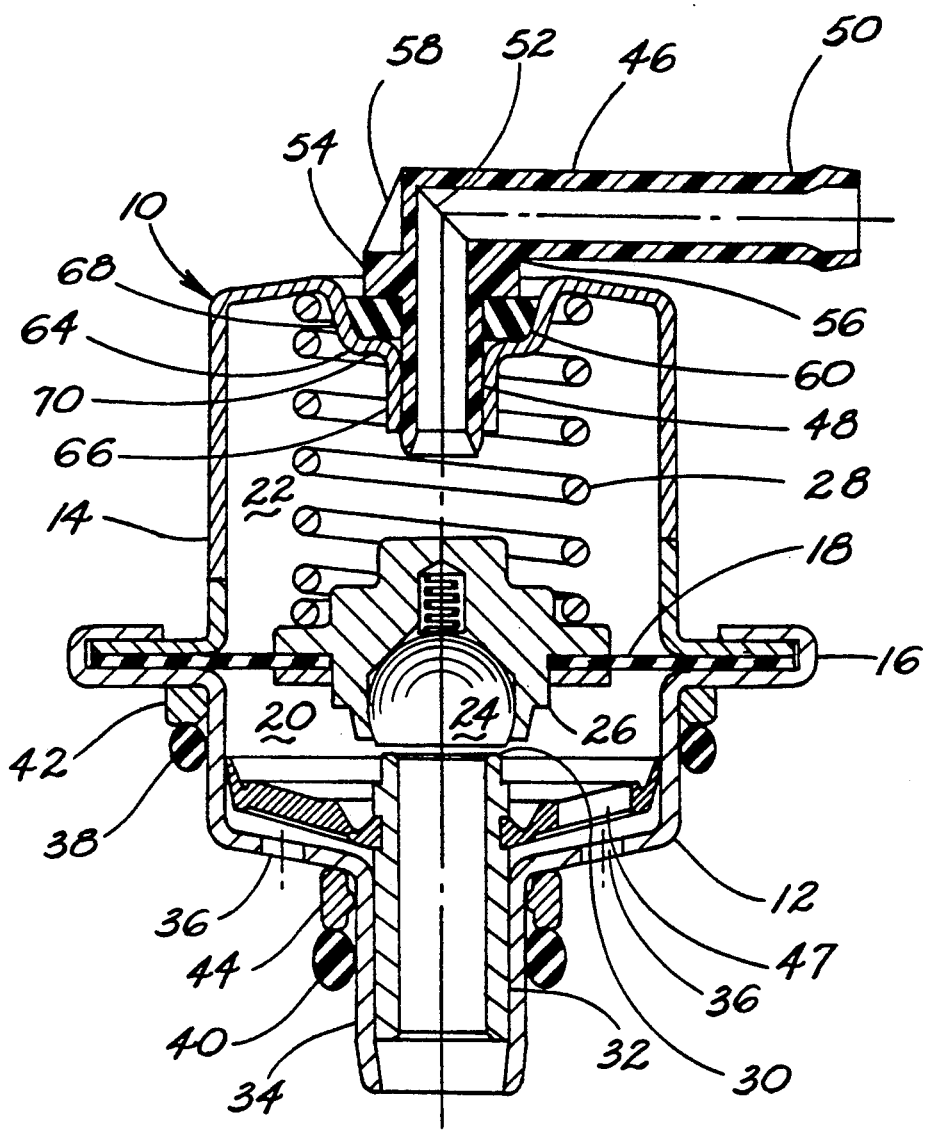
FIG. 1 is a longitudinal view through a representative fuel pressure regulator embodying principles of the invention.

FIG. 1 shows a representative fuel pressure regulator 10 that insofar as the pressure regulating function is concerned is analogous to the fuel pressure regulators described in the above-mentioned commonly assigned patents. It comprises a cylindrical base 12 and a cylindrical cover 14, both formed from drawn sheet metal, that are assembled together at a joint 16 which traps the circular outer margin of a diaphragm assembly 18 that divides the interior of the housing formed by the base and cover into a fuel chamber 20 and a control chamber 22. Diaphragm assembly 18 is part of a pressure regulating mechanism that further includes a valve element 24 contained in a mount 26 at the center of the diaphragm assembly, and a helical coil spring 28 that is disposed in control chamber 22 and acts to resiliently bias valve element 24 toward a valve seat 30 at the upper end of a tube 32 that is mounted on base 12 concentrically within an integral sleeve 34 formed in the base. Base 12 comprises a fuel supply port for fuel chamber 20 in the form of several arcuate slots 36 through the annular wall of base 12 that surrounds the upper end of sleeve 34. The passageway through tube 32 and sleeve 34 constitutes a fuel return port via which excess fuel is returned to tank in an amount that is controlled by the extent to which valve element 24 restricts the flow through valve seat 30. An internal filter 47 is disposed between the fuel supply port and seat 30 to separate certain particulate matter from the fuel before it can reach the seat. O-ring seals 38, 40 and their back-up washers 42, 44 provide for the pressure regulator to be mounted in a suitably sealed manner in a suitable pressure regulator receptacle in a fuel rail (not shown).

The fuel pressure regulator comprises a vacuum control port 46, and it is to vacuum control port 46 and its mounting on the fuel pressure regulator that the present invention relates. Vacuum control port 46 is a plastic part that is formed by injection-molding of any plastic material that is suitable for use in a fuel pressure regulator application. It is a tube having a proximal end portion 48 that fits into the housing and a distal end portion 50 that is adapted to receive the end of a conduit (not shown) via which engine intake manifold vacuum is conveyed to the pressure regulator. Between these two end portions 48 and 50, vacuum control port 46 comprises an elbow, or bend, 52 which disposes the two end portions at a right angle to each other. Proximate elbow 52, proximal end portion 48 comprises an integral circular flange 54 that extends completely around the outside of its circumference. Flange 54 merges with distal end portion 50, directly at the location identified by the numeral 56, and by means of a triangular web 58 diametrically opposite location 56, thereby strengthening the elbow.

Figure 2:
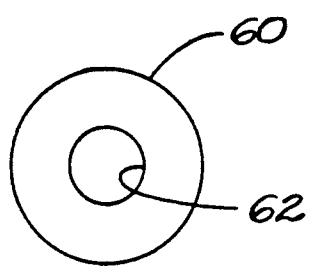
FIG. 2 is a plan view of one of the parts by itself.

A circular annular sealing ring 60 is also used in the mounting of vacuum control port 46 on the housing. Sealing ring 60 is shown by itself in FIG. 2 and comprises a central circular hole 62 for fitting onto proximal end portion 48. The circular axial end faces of sealing ring 60 are flat, but its side face is tapered thus making one axial end face a larger diameter than the other.

For receiving proximal end portion 48 of vacuum control port 46 and sealing ring 60, the end wall of housing cover 14 is centrally constructed to comprise an integral depression 64 and port-receiving tube 66 that are concentric. Depression 64 comprises a tapered sidewall 68 and a flat annular bottom wall 70 that are congruent with the tapered side face and smaller axial end face of sealing ring 60. Port-receiving tube 66 extends a limited distance inwardly of the housing from wall 70.

Vacuum control port 46 is assembled to housing cover 14 by aligning proximal end portion 48 with depression 64 and port-receiving tube 66 and advancing it so as to insert proximal end portion 48 into port-receiving tube 66 and compress sealing ring 60 in the process to create a leak-proof mounting that prevents loss of control vacuum from control chamber 22. The relative fit of proximal end portion 48 in port-receiving tube 66 provides lateral support of control vacuum port 46 against cocking on the housing. Sealing ring 60 is disposed wholly within depression 64, and proximal end portion 48 protrudes a short distance beyond the inner end of tube 66. Once the vacuum control port has been inserted the proper amount into the housing, the two are joined to retain them in assembly.

One way of joining is by heat staking tube 66 and proximal end portion 48 together by means of heat staking equipment. Another way is ultrasonic welding by means of ultrasonic welding equipment.

Figure 3:
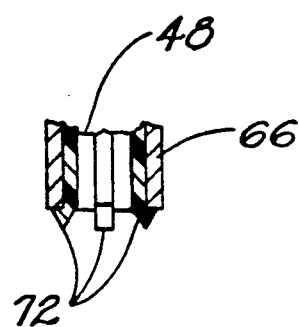
FIG. 3 is a fragmentary view of a portion of FIG. 1, but showing a modified form.

Still another way of maintaining the parts in assembly is shown in FIG. 3 to comprise a snap catch type of attachment. For example, proximal end portion 48 may be constructed to comprise several hooked catches 72 that are integrally cantilevered on proximal end portion 48. The hooked distal ends of these catches will flex radially inwardly of tube 66 upon insertion of proximal end portion 48 into tube 66, allowing the insertion to occur. Once the insertion has reached the point where the hooks clear the end edge of proximal end portion 48, they snap back to catch behind that end edge, preventing control vacuum port 46 from being extracted. The use of this form of attachment is advantageous because the attachment can be performed either manually or automatically with little or no equipment, and either before or after the cover has been assembled onto the base.

While one particular embodiment has been illustrated and described, principles of the invention extend to other equivalent embodiments. The invention can be used for mounting a vacuum control port on other locations of the cover, and the vacuum control port may contain an elbow as shown, or it may be straight.

What is claimed is:

1. A fuel pressure regulator valve comprising a housing containing a pressure-regulating mechanism including a movable diaphragm assembly that divides said housing into a fuel chamber and a control chamber, a fuel supply port at which fuel whose pressure is to be regulated is supplied to said fuel chamber, a fuel return port via which excess fuel is diverted from said fuel chamber, a valve seat disposed in said fuel chamber for cooperation with a valve element carried by said diaphragm assembly to perform a pressure-regulating function on fuel supplied to said fuel chamber via said fuel supply port by diverting excess fuel from said fuel chamber via said fuel return port, and a tubular vacuum port that is assembled to said housing and functions to communicate said control chamber to a source of control vacuum, characterized in that said tubular vacuum port is a molded plastic part that comprises a proximal end portion via which said tubular port is mounted on said housing and a distal end portion that is adapted for connection to a conduit via which control vacuum from such source is conveyed to said control chamber of the fuel pressure regulator valve, flange means is disposed on and circumferentially about said tubular port proximate said proximal end portion, annular sealing means is disposed on and about said proximal end portion between said flange means and an annular portion of said housing that faces said flange means, a port-receiving tube that is formed integrally in said housing extends a limited distance into said control chamber from said annular portion of said housing, said proximal end portion of said tubular port is closely received in said port-receiving tube so that said port-receiving tube provides lateral support of said tubular port against cocking on said housing, and means retaining said tubular port in said port-receiving tube to render said sealing means effective in preventing loss of control vacuum from said control chamber of said housing via the mounting of said tubular port on said housing and to maintain said port-receiving tube in such lateral support of said tubular port.

2. A fuel pressure regulator valve as set forth in claim 1 characterized further in that said flange means comprises a circumferentially continuous flange integrally formed with said tubular port.

3. A fuel pressure regulator valve as set forth in claim 1 characterized further in that said annular portion of said housing forms a bottom wall of a depression in said housing and said sealing means is disposed wholly within said depression.

4. A fuel pressure regulator valve as set forth in claim 3 characterized further in that said depression comprises a tapered sidewall extending away from said bottom wall, and in that said sealing means comprises a circumferentially continuous tapered sidewall.

5. A fuel pressure regulator valve as set forth in claim 1 characterized further in that said proximal end portion of said tubular port protrudes inwardly of said control chamber beyond said port-receiving tube.

6. A fuel pressure regulator valve as set forth in claim 1 characterized further in that said tubular port comprises a bend so as to have its proximal and distal end portions non-coaxial.

7. A fuel pressure regulator valve as set forth in claim 6 characterized further in that said proximal and distal end portions are at a right angle, and a portion of said flange means integrally merges with a portion of said distal end portion to strengthen said bend.

8. A fuel pressure regulator valve as set forth in claim 1 characterized further in that said housing is metal.

9. A fuel pressure regulator valve as set forth in claim 1 characterized further in that said means retaining said tubular port in said port-receiving tube comprises snap catch means that allows said proximal end portion of said tubular port to be inserted into said port-receiving tube at the time of mounting of said tubular port to said housing and that prevents said tubular port from being removed from said housing after mounting.

* * * * *